[54] COMPOSITE THERMAL INSULATION

[75] Inventors: Robert D. Allen; Wayne M. Lysher, both of Richland, Wash.

[73] Assignee: McDonnell Douglas Corporation, Santa Monica, Calif.

[22] Filed: Sept. 3, 1969

[21] Appl. No.: 854,932

[52] U.S. Cl. .................161/125, 138/149, 161/139, 161/162, 161/165, 161/207, 161/213, 161/225, 220/9 A
[51] Int. Cl. ........B32b 1/08, B32b 5/16, B32b 15/16
[58] Field of Search......161/125, 139, 162, 165, 207, 161/213, 225; 138/149, 141, 140; 215/12 A, 13 R; 220/9 A, 9 LG, 9 G, 10

[56] References Cited

UNITED STATES PATENTS

| | | | |
|---|---|---|---|
| 1,661,254 | 3/1928 | Gillies | 138/149 |
| 2,198,885 | 4/1940 | Price | 161/162 |
| 2,937,780 | 5/1960 | Beckwith | 220/9 AL |
| 3,009,600 | 11/1961 | Matsch | 161/165 |
| 3,150,794 | 9/1964 | Schlumberger et al. | 220/9 AL |
| 3,361,284 | 1/1968 | Luka et al. | 220/10 |
| 3,151,364 | 10/1964 | Glaser et al. | 220/10 |
| 3,559,835 | 2/1971 | Lange | 220/10 |
| 3,390,703 | 7/1968 | Matlow | 220/9 A |
| 3,118,194 | 1/1964 | Biais | 220/9 LG |
| 3,367,530 | 2/1968 | Kordyban et al. | 138/149 |

*Primary Examiner*—Robert F. Burnett
*Assistant Examiner*—George W. Moxon, II
*Attorney*—Max Geldin

[57] ABSTRACT

Composite thermal insulation comprising layers of particulate material including materials having low conductivity above 1,000°C, e.g. amorphous carbon black, and materials having low conductivity below 1,000°C, e.g. zirconia, disposed alternately with one or more layers of metal sheet, e.g. tantalum foil. The first and last layers are comprised of particulate material.

16 Claims, 5 Drawing Figures

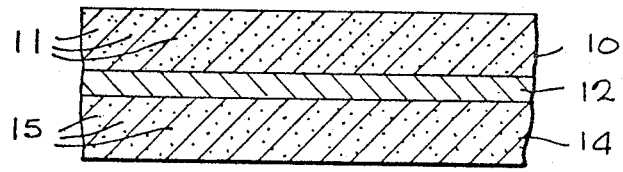
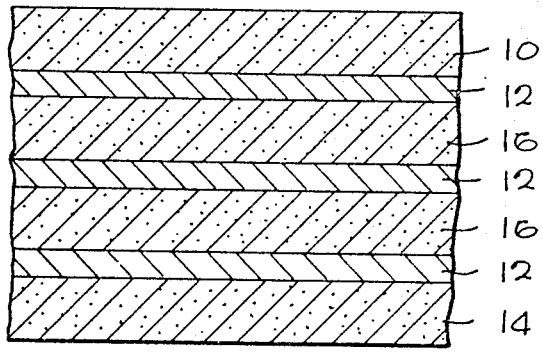
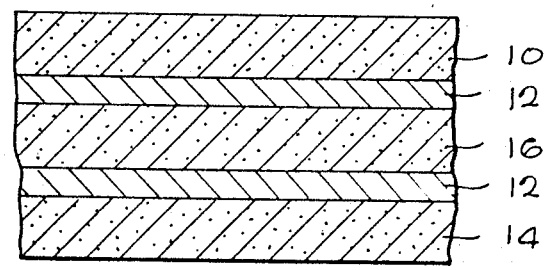

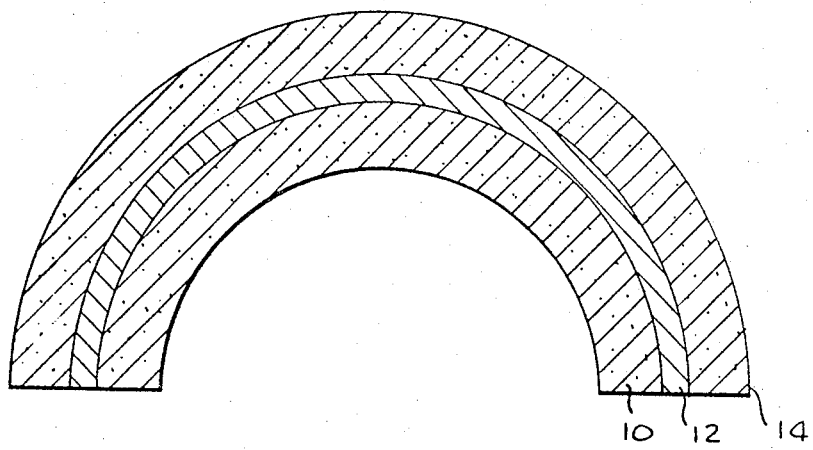
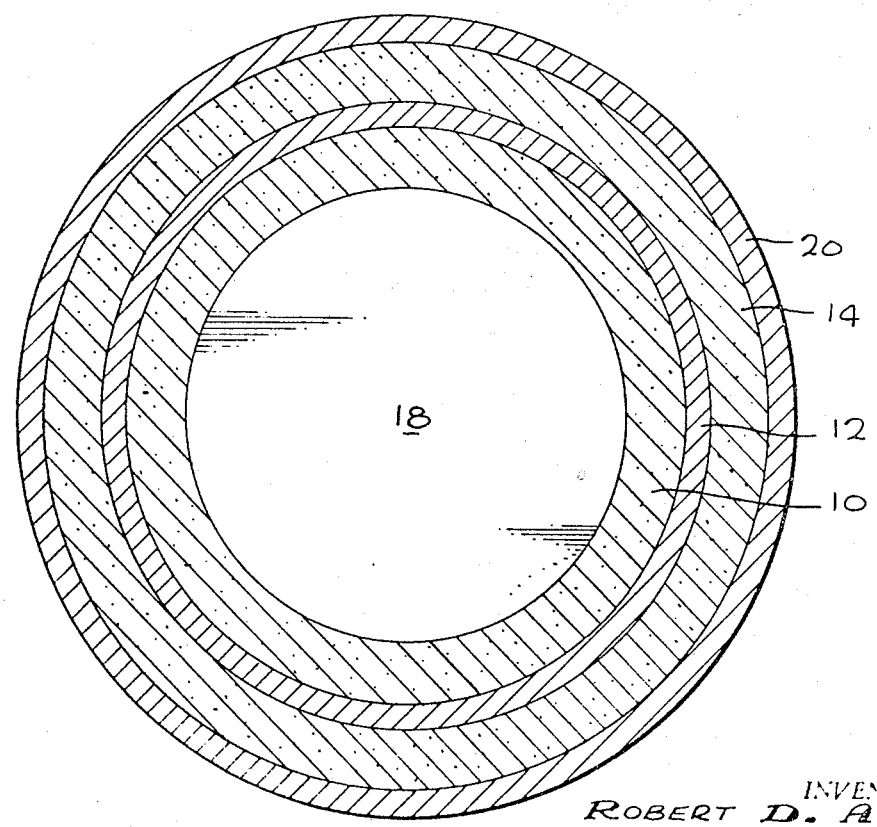

COMPOSITE THERMAL INSULATION

This invention relates to thermal insulation and particularly to insulation in the form of a composite of layers of particulate, heat resistant materials having low conductivity above and/or below 1,000°C, separated by metal sheets.

In recent years there has been considerable interest in thermal insulating materials for application where very high and/or very low temperatures are encountered and where it is desired to prevent transfer of heat, for example, from a region of high temperature of the order of 1,000°–2,000°C. to a region of low temperature e.g., below −100°C, up to 1,000°C, and especially at the extremes of such ranges. Such instances are found for example, in high performance aircraft, conservation of heat in arctic regions, conservation of cold in low temperature electrical conductivity studies, in combustion technology, gas turbines, turbojet engines, etc.

Naturally the specific requirements for such thermal insulation will vary with the particular application contemplated. In general, however, such materials desirably possess very low thermal conductivity, high-temperature stability, load-bearing characteristics, chemical compatibility with associated structural materials, and fabricability.

Prior art insulating materials have consisted mainly of fused refractory mixtures, for example those comprising various metal and metal oxide solutions, fused metal oxides and cermets, which consist of ceramic compositions made by bonding grains of refractories such as metal carbides, nitrides, etc. with metal.

The above material while satisfactory for some applications does not provide thermal insulation over a broad enough temperature range, and furthermore are subject to internal chemical reaction and transverse fracturing.

Other materials which have been employed as thermal insulators include granular insulations. These also do not provide thermal insulation over a broad enough temperature range, are chemically and physically unstable being subject to failure caused by sintering and fracturing, and are not readily fabricable.

It has now unexpectedly been discovered that substantially all of the above disadvantages can be overcome by means of a composite thermal insulation comprised of separate layers of particulate material selected from the group consisting of (A) materials characterized by low thermal conductivity above 1,000°C and (B) material characterized by low thermal conductivity below 1,000°C arranged alternately with and separated by one or more layers of metal sheets, and wherein the first and last layers are comprised of particulate material.

The novel composite thermal insulation of the invention provides very low thermal conductivity up to 2,000°C. This is partially due to the fact that while most prior art materials employ particles which are physically or chemically bonded together and thus conduct heat readily, the composite of the invention employ particulate unbonded particles. Further, the particulate layers of the novel composite are separated by metal sheets which prevent commingling or reaction between adjacent layers. The metal sheets provide additional advantages by acting as radiation shields, as barriers to thermal conduction, as barriers to transverse fracturing, and as internal structural support for the separate particulate layers.

Additional advantages provided by the composite thermal insulation of the invention include the facts that it is load-bearing, is not subject to failure caused by sintering and fracturing, is easy to fabricate and is relatively inexpensive.

The invention will be more easily understood by reference to the description below of certain preferred embodiments of the invention taken in connection with the accompanying drawing wherein:

FIG. 1 is a schematic, partially fragmented, cross-sectional representation of a three layer composite thermal insulation according to the invention;

FIGS. 2 and 3 show in cross-section multilayer composite thermal insulation similar to FIG. 1;

FIG. 4 shows a three layer composite having a hemispherical configuration; and

FIG. 5 shows the insulation of FIG. 4 positioned around a heat source.

Referring now to FIG. 1 there is shown a three layer composite having a first layer 10 of particulate material characterized by having low thermal conductivity above 1,000°C, e.g., amorphous carbon black, the particles of such material being indicated at 11, a second layer adjacent the first layer and substantially coextensive therewith, comprised of a metal sheet 12, e.g., tantalum foil, and a third layer 14 of particulate material characterized by having low thermal conductivity below 1,000°C, e.g., zirconia, the particles of which are indicated at 15, disposed adjacent the metal sheet 12 so that the metal sheet 12 separates the layers 10 and 14 of particulate material.

FIGS. 2 and 3 show substantially the same arrangement of layers of particulate material separated by layers of metal sheet material, except for the number of layers which is greater in the composites shown in FIGS. 2 and 3. FIG. 2 shows a seven layer insulation and FIG. 3 a five layer insulation according to the invention. As in FIG. 1, the first layer 10 in FIGS. 2 and 3 is comprised of a particulate material having a low thermal conductivity above 1,000°C, such as amorphous carbon black, and the last layer 14 is comprised of a particulate material having a low thermal conductivity below 1,000°C, such as zirconia. Intermediate layer or layers 16 can be of particulate material identical with first layer 10 or last layer 14, i.e., such layers can be comprised either of particulate material having low thermal conductivity above 1,000°C or below 1,000°C. The layers of metal sheet 12, such as tantalum foil separate the respective particulate layers 10, 16 and 14.

FIG. 4 shows a three layer composite thermal insulation similar to that of FIG. 1 except that here the composite has a hemispherical cross-sectional configuration.

The composites illustrated in FIGS. 1 to 4 are merely illustrative of the invention and are not intended as limitative. The outermost layers of the composite are materials having low thermal conductivity above or below 1,000°C, generally formed of compacted unbonded particles of such materials. The composites of FIGS. 1 to 4 have one outer layer of particulate material characterized by low thermal conductivity above 1,000°C and the other outer layer of material characterized by low thermal conductivity below 1,000°C and constitute preferred embodiments because of their overall versatility and applicability. Depending on the desired application, however, all of the particulate layers can be identical, i.e., all can be of material characterized by low thermal conductivity above 1,000°C or all of material characterized by low thermal conductivity above 1,000°C.

Inner particulate layers separated by layers of metal sheet as shown in FIGS. 2 and 3 can be of material having low thermal conductivity either above and/or below 1,000°C.

Similarly, while flat, i.e., planar, and hemispherical cross-sectional composite configurations are shown in the drawing, these are merely illustrative and other configurations of composite according to the invention can be used as well, as for example spherical, cylindrical, or other fabricable geometric shapes.

FIG. 5 shows the composite insulation of FIG. 4 positioned in place around a high temperature heat source 18 of substantially cylindrical configuration. The metal sheet 12, e.g., tantalum foil, is placed concentrically over and spaced from a heat source 18 and a layer 10 of particulate material characterized by having low thermal conductivity above 1,000°C, e.g., amorphous carbon black, is packed to the desired thickness between the metal sheet 12 and the heat source 18. An outer container or housing 20, e.g., of stainless steel, also concentric with the inner configurations of the metal sheet 12 and heat source 18 is placed over the metal sheet, and a layer of particulate material 14 characterized by having low thermal conductivity below 1,000°C, e.g., zirconia powder, is packed into the space between the outer container 20 and the metal sheet 12. A pressure of about 5 psi is then applied to maintain the cylindrical composite thermal insulation in place over the heat source.

In utilizing the thermal composite, for example as illustrated in FIG. 1, the side of the composite comprised of layer 10 is placed adjacent or facing a hot zone or high temperature source requiring insulation while the side of the composite comprised of layer 14 is placed adjacent or facing a cold zone requiring insulation. In this manner the composite thermal insulation prevents conduction of heat through layer 10 to the cold zone and at the same time prevents conduction of cold through layer 14 to the hot zone. The metal sheet 12 separating layers 10 and 14 acts as a radiation shield against heat or cold penetration and in combination with insulating layers 10 and 14 substantially reinforces and improves the insulating action of the layers 10 and 14 respectively. Thus, the invention composite thermal insulation permits the presence of very hot and very cold areas in proximity without substantial loss of heat or cold from the respective areas.

As described above, the composite contains layers of particulate material selected from the group consisting of (A) materials characterized by low thermal conductivity above 1,000°C and (B) materials characterized by low thermal conductivity below 1,000°C. Examples of material (A) comprise among others amorphous carbon powder such as charcoal, coke, lamp black, and particularly amorphous carbon black, boron carbide, boron nitride, zirconium nitride, rare earth oxides such as neodymium oxide and samarium oxide, thorium oxide, zirconium oxide and zirconium carbide, and mixtures of the above materials. Examples of material (B) include among others amorphous carbon powder such as amorphous carbon black, zirconia (zirconium oxide), stabilized zirconia including calcia, yttria, or magnesia stabilized zirconia, tungsten coated zirconia powder, boron nitride, boron carbide, silicon nitride, titanium nitride, zirconium nitride, aluminum oxide, magnesium oxide, rare earth oxides such as neodymium oxide and samarium oxide, silicon dioxide, and mixtures thereof. Of the above materials, amorphous carbon, especially amorphous carbon black, or boron carbide, is most preferred for material (A) and zirconia for material (B).

It is apparent that certain of the above mentioned materials have low thermal conductivity both above and below 1,000°C, i.e., fall into the materials of groups (A) and (B), as for example boron carbide, boron nitride, etc. However, certain of the materials of group (A) and (B) possess exceptionally low conductivity above and below 1,000°C, respectively, such as amorphous carbon black, boron carbide, and zirconia, and are therefore preferred.

Materials (A) and (B) must be in particulate form according to the invention to substantially eliminate thermal conductivity between adjacent particles. Although relatively coarse particles can be employed, best results are obtained by use of particles of small size. Preferably substantially all, e.g., up to about 100 percent, of the particles of the particulate layers are of a size passing through a 200 mesh screen, and most desirably are of a size passing through a 400 mesh screen.

It has also been found that superior insulation effects are obtained when the particulate material is substantially free of occluded gas. In most instances heating of the particulate material in vacuum prior to assembly of the composite removes most occluded gas impurities. If desired, the formed composite can be evacuated conveniently by placing the insulation within a gas-tight container, evacuating the container on the order of $1 \times 10^{-4}$ torr or less, and then sealing the container. As an alternative, the composite can be assembled in a vacuum box.

In some instances it may be desirable to add one or more gettering chemical agents to the insulation to prevent an increase in pressure as a function of time after sealing of a device or housing containing such insulation. Examples of suitable gettering agents which can be employed include finely divided zirconium, titanium, and barium. These agents act to trap released gas by being oxidized or by physical absorption.

The thickness of the particulate layers 10, 14 and 16 of the invention composites illustrated in the drawings can vary over a wide range. In general, for most applications an individual particulate layer thickness in the range of from about 20 mils to about one inch provides the desired insulating effects. Preferably such layers have a thickness in the range of from about 100 to about 500 mils. Of course thicker layers can be employed if desired but do not materially add to the insulation properties while increasing the expense and weight of the composite.

The layers of metal sheet separating the layers of particulate material can comprise metals or alloys. These include particularly high melting point and refractory metals and alloys. Specific examples of suitable metals and alloys include chromium, cobalt, copper, gold, iron, vanadium, molybdenum, nickel, niobium, platinum, rhodium, tantalum, titanium, tungsten, aluminum, zirconium, zinc, germanium, silver, tin, beryllium, hafnium, iridium, manganese, palladium, rhenium, antimony, yttrium, and alloys thereof. Of the above, the metals preferred for high temperature insulation are tantalum, molybdenum, niobium, tungsten and rhenium, or alloys thereof, with vanadium, titanium, hafnium, zirconium, iron, palladium, yttrium, iridium and chromium, and alloys thereof also being desirable in this respect. Aluminum, copper, zinc, silver, tin, gold, platinum metals, and alloys thereof can be used for lower temperature insulation. Representative commercially available alloys of the above metals which can be used include, for example, Inconel X-750 and Hastelloy N, both nickel alloys, Haynes metal, which are cobalt alloys also containing chromium and tungsten in varying proportions, such as Haynes 188, and Rene 41, a nickel base alloy containing chromium, cobalt and molybdenum.

The thickness of the metal sheet or foil can vary, but is normally in the range of from about 1 to about 5 mils and preferably in the range of from about 1 to about 3 mils.

The exact thickness of the layers of metal sheet and particulate material can be tailored to the particular application required. As a practical matter, undue thickness of these layers limits fabricability and scope of utilization and increases the cost.

The thermal insulation composite of the invention can be produced by layering and particulate materials and metal sheets in a mold and pressing lightly, for example at about 5 psi, to effect adherence of the particles of the particulate materials and refractory metal sheet together, but without any significant bonding of the particles of the particulate materials and without any substantial alteration of the integrity of the layers.

The following examples are presented for the purpose of illustrating the invention and are not intended to constitute a limitation thereof.

EXAMPLE 1

Thermal insulation composite substantially as shown and described in FIG. 4 is fabricated using amorphous carbon black as material (A) in layer 10, zirconia as material (B) in layer 14, and tantalum foil as the metal sheet 12. The particulate amorphous carbon black having a particle size range of from about 0.1 to about 0.2 microns, and substantially all of which passes through a 325 mesh screen, is placed in a hemispherical mold to a thickness of 0.35 in., a 1 mil thick sheet of tantalum foil is placed on top of the first layer, followed by a 0.4 in. layer of zirconia having a particle size range of from about 1 to about 15 microns, and substantially all of which passes through a 325 mesh screen. The resulting assembly is pressed at 5 psi to form the composite.

The thermal conductivity of the above composite is tested by means of a technique utilizing electron-beam heating in conjunction with a hollow hemispherical Armco iron calorimeter containing the specimen, a hemispherical tantalum target at the specimen's center, a hemispherical insulated container for the calorimeter. The target, calorimeter and insulated container are arranged concentrically. A vacuum environment and thermoelectric temperature measuring devices are provided.

A given electron beam power setting produces a constant temperature in the hemispherical surface of the tantalum button. Heat generated in the tantalum button by the electron beam passes radially through the hollow hemispherical test material to the Armco iron heat sink. Calorimetric measurement of total heat added to the heat sink provides values which are used to calculate the thermal conductivity of the test specimen.

The composite of Example 1 is placed in the hollow hemispherical iron calorimeter with the layer of amorphous carbon black facing the tantalum button. The thermal conductivity obtained for the composite at varying temperatures is given below in Table I.

Since the above described thermal conductivity testing apparatus and technique are conventional and well known, and form no part of the present invention, such apparatus is not shown in the drawing.

TABLE I

| Thermal Conductivity in (cal/cm sec °C) × 10$^4$ | Temperature |
|---|---|
| 0.405 | 799°C |
| 0.676 | 1180°C |
| 1.27 | 1552°C |
| 1.67 | 1905°C |

For purposes of comparison, the thermal conductivities of various single phase granular powders as well as that of a composite of layers of amorphous carbon black separated by layers of pyrolytic graphite, and having comparable thickness to the above described invention composite, are determined by means of the electron-beam method described above. The results are presented below in Table II. In the Table "first sequence" refers to values obtained initially and "second sequence" refers to values obtained after a period of heating and shows changes due to sintering.

TABLE II

| Insulation | Thermal Conductivity in (cal/cm sec °C) × 10$^4$ | Temperature °C |
|---|---|---|
| Amorphous carbon black-particle size 0.1 to 0.2 microns | 0.703 | 810 |
|  | 1.01 | 920 |
|  | 1.22 | 1010 |
|  | 0.998 | 1025 |
|  | 1.38 | 1120 |
|  | 1.69 | 1181 |
|  | 1.55 | 1220 |
|  | 2.13 | 1320 |
|  | 2.15 | 1420 |
|  | 2.66 | 1515 |
|  | 3.28 | 1615 |
|  | 2.54 | 1622 |
|  | 4.20 | 1720 |
|  | 4.46 | 1830 |
|  | 4.79 | 2000 |
| Zirconia-particle size range 1–15 microns | First Sequence | |
|  | 0.724 | 1120 |
|  | 0.775 | 1263 |
|  | 1.40 | 1582 |
|  | 1.93 | 1762 |

| Material | Thermal Conductivity | Temperature (°C) |
|---|---|---|
| | 2.72 | 1942 |
| | 3.36 | 2052 |
| Zirconia-particle size range 1–15 microns | | |
| *Second Sequence* | | |
| | 1.21 | 792 |
| | 1.56 | 988 |
| | 1.93 | 1204 |
| | 2.26 | 1417 |
| | 2.84 | 1615 |
| | 3.27 | 1846 |
| | 3.98 | 1956 |
| Zirconium Carbide particle size range 5–40 microns | | |
| *First Sequence* | | |
| | 0.813 | 796 |
| | 0.972 | 910 |
| | 0.882 | 1012 |
| | 1.32 | 1120 |
| | 1.94 | 1236 |
| *Second Sequence* | | |
| | 1.12 | 904 |
| | 1.75 | 1122 |
| | 1.85 | 1237 |
| | 2.35 | 1341 |
| | 3.35 | 1495 |
| | 4.34 | 1621 |
| Zirconia/Zirconium Carbide-50-50 mixture by weight | | |
| *First Sequence* | | |
| | 0.593 | 805 |
| | 0.742 | 1010 |
| | 0.945 | 1210 |
| Zirconia/Zirconium Carbide-50-50 mixture by weight | | |
| *First Sequence* | | |
| | 1.33 | 1420 |
| | 1.68 | 1615 |
| | 3.31 | 2015 |
| *Second Sequence* | | |
| | 1.34 | 1220 |
| | 1.78 | 1310 |
| | 2.08 | 1515 |
| | 2.19 | 1615 |
| | 2.28 | 1700 |
| | 2.95 | 1830 |
| | 3.47 | 1900 |
| | 4.05 | 2015 |
| Tungsten-Coated Zirconia Powder-8% by weight Tungsten | | |
| | 1.01 | 904 |
| | 1.12 | 1012 |
| | 1.46 | 1122 |
| | 1.67 | 1236 |
| | 2.01 | 1356 |
| | 2.57 | 1484 |
| | 3.07 | 1618 |
| | 3.68 | 1759 |
| | 4.61 | 1903 |
| Magnesia-particle size range 5–40 microns | | |
| | 0.458 | 813 |
| | 1.63 | 1227 |
| | 3.58 | 1422 |
| Boron Nitride particle size range 0.5–6 microns | | |
| | 1.06 | 798 |
| | 1.36 | 1012 |
| | 1.43 | 1122 |
| | 2.04 | 1236 |
| | 2.44 | 1357 |
| | 2.74 | 1484 |
| | 3.14 | 1652 |
| | 3.61 | 1830 |
| Boron Carbide particle size range 1–15 microns | 0.24 | 434 |
| | 0.65 | 849 |
| | 0.89 | 983 |
| | .086 | 1120 |
| | 1.39 | 1263 |
| | 1.41 | 1417 |
| | 2.09 | 1581 |
| | 2.54 | 1755 |
| | 3.23 | 1937 |
| | 3.98 | 2072 |
| Composite of amorphous carbon black/ pyrolytic graphite/ amorphous carbon black | 0.374 | 800 |
| | 1.123 | 1237 |
| | 2.545 | 1620 |
| | 3.571 | 1980 |
| Composite of amorphous carbon black/ pyrolytic graphite/ amorphous carbon black/ pyrolytic graphite/ amorphous carbon black | 0.303 | 795 |
| | 0.731 | 1237 |
| | 1.422 | 1637 |
| | 1.957 | 2010 |
| Composite of amorphous carbon black/ pyrolytic graphite/ amorphous carbon black/pyrolytic graphite/ amorphous carbon black/pyrolitic graphite/amorphous carbon black | 0.496 | 800 |
| | 0.681 | 1180 |
| | 1.364 | 1552 |
| | 1.933 | 1905 |

A comparison of the above thermal conductivity values for the composite thermal insulation of the invention in Table I with the various insulating powders and with the carbon-pyrolytic graphite composites of Table II shows clearly the superiority and effectiveness of the invention composite. For example, at about 1,900°C the invention composite having only 3 layers has a thermal conductivity of 1.67 (cal/cm sec °C) × $10^{-4}$ while the seven-layer carbon-pyrolytic graphite composite has a thermal conductivity of 1.933 (cal/cm sec °C) × $10^{-4}$. None of the powdered insulation materials used alone has values anywhere near that of the invention composite. Furthermore, most of these powders are subject to at least moderate sintering while the invention composite shows no sintering or radial fracturing.

EXAMPLE 2

In the manner described in Example 1, a three layer composite is formed having a first layer of boron nitride powder of particle size range of 0.5 to 6 microns, a second layer of tungsten foil of 1 mil thickness, and a third layer of magnesium oxide powder having a particle size range of 5–40 microns. The powder layers each have a thickness of 0.3 in. The resulting composite exhibits low thermal conductivity and other properties comparable with the composite of Example 1.

Substantially the procedure of Example 1 is repeated to produce a five-layer composite having first and third layers of amorphous carbon black of particle size range 0.1 to 0.2 microns, second and fourth layers of 1 mil thick tantalum foil, and a fifth layer of zirconia having a particle size range of 1 to about 15 microns. The powder layers each have a thickness of 0.2 in. The resulting composite exhibits thermal conductivity which is somewhat lower than the composite of Example 1. Other properties are comparable.

EXAMPLE 4

Substantially the procedure of Example 1 is followed to produce a three-layered composite having a first and third layer of a mixture of 50 percent by weight zirconium carbide of particle size range 1–15 microns and 50 percent by weight zirconia of particle size range 1 to 15 microns, and a second layer of 1 mil thick molybdenum foil. The resulting composite exhibits low thermal conductivity comparable to the composite of Example 1.

EXAMPLE 5

Substantially the procedure of Example 1 is repeated to produce a five-layer composite having first and third layers of boron carbide of particle size range 1–15 microns, a second layer of 1 mil thick tantalum foil, a fourth layer of 1 mil thick nickel foil, and a fifth layer of zirconia powder of particle size range 1–15 microns. A flat mold is employed so that the resulting composite has the configuration of FIG. 3. The resulting composite is placed in a gas-tight container which is evacuated to about $1 \times 10^{-4}$ torr and sealed until tested for conductivity. The conductivity of the resulting composite is found to be somewhat lower than the composite of Example 1.

Thus the composite thermal insulation of the invention provides exceptionally low thermal conductivity when compared with powdered materials used alone or when compared with a composite of carbon and pyrolytic graphite. Furthermore, the composite of the invention is not subject to sintering and radial fracturing.

Various modifications and adaptations of the invention will occur to those skilled in the art and can be resorted to without departing from the spirit and scope of the invention, and hence the invention is not to be taken as limited except by the scope of the appended claims.

We claim:

1. A composite suited for thermal insulation comprising separate layers of particulate material selected from the group consisting of (A) materials characterized by low thermal conductivity above 1,000°C, and (B) materials characterized by low thermal conductivity below 1,000°C arranged alternately with and separated by one or more layers of metal sheet, and wherein the first and last layers are comprised of layers of said particulate material, wherein one of said first and last layers comprises material (A) and the other comprises material (B), and wherein said particulate material (A) is selected from the group consisting of amorphous carbon powder, boron carbide, boron nitride, zirconium nitride, rare earth oxides, thorium oxide, zirconium oxide and zirconium carbide, and mixtures thereof, and wherein said particulate material (B) is selected from the group consisting of amorphous carbon powder, zirconia, stabilized zirconia, tungsten coated zirconia powder, boron nitride, boron carbide, silicon nitride, titanium nitride, zirconium nitride, aluminum oxide, magnesium oxide, rare earth oxides, silicon dioxide, and mixtures thereof, and wherein particulate layer (A) is different from particulate layer (B).

2. The composite of claim 1, comprising three layers wherein said metal sheet is disposed between particulate layer (A) and particulate layer (B).

3. The composite of claim 2, wherein particulate layer (A) is amorphous carbon black, particulate layer (B) is zirconia, and the metal sheet is of tantalum.

4. The composite of claim 3, wherein said particulate layers have a thickness in the range of from about 20 mils to about 1 inch, and wherein said layers of metal sheet have a thickness in the range of from about 1 to about 5 mils.

5. The composite of claim 1, wherein said metal sheet is selected from the group of metals consisting of Cr, Co, Cu, Au, Fe, V, Mo, Ni, Nb, Pt, Rh, Ta, Ti, W, al. Zr, Zn, Ge, Ag, Sn, Be, Hf, Ir, Mn, Pd, Re, Sb, Y, and alloys thereof.

6. The composite of claim 1 wherein said metal sheet is selected from the group of metals consisting of Ta, Mo, Nb, W and Re.

7. The composite of claim 1, wherein particulate layer (A) is amorphous carbon black, particulate layer (B) is zirconia, and the metal sheet is of tantalum.

8. The composite of claim 1, wherein substantially all of the particles of said particulate layers pass through a 200 mesh screen.

9. The composite of claim 1, wherein said particulate layers are substantially free of occluded gas.

10. The composite of claim 1, wherein said particulate layers have a thickness in the range of from about 20 mils to about one inch, wherein said layers of metal sheet have a thickness in the range of from about 1 to about 5 mils.

11. The composite of claim 1, said composite having a planar, cylindrical or spherical configuration.

12. The composite of claim 1, comprising five layers, and including two said layers of metal sheet.

13. The composite of claim 12, including first and third layers of particulate boron carbide, a second layer of tantalum sheet, a fourth layer of nickel sheet, and a fifth layer of particulate zirconia.

14. The composite of claim 1, wherein said particulate layers have a thickness in the range of from about 100 to about 500 mils, and wherein said layers of metal sheet have a thickness in the range of from about 1 to about 3 mils.

15. The composite of claim 1, wherein said particulate material (A) is selected from the group consisting of amorphous carbon black and boron carbide, and said particulate material (B) is zirconia.

16. The composite of claim 15, wherein said metal sheet is tantalum.

* * * * *